United States Patent
Yoda et al.

(10) Patent No.: US 6,369,992 B1
(45) Date of Patent: *Apr. 9, 2002

(54) YOKE-TYPE HEAD WITH MAGNETO-RESISTANCE EFFECT FILM RECESSED FROM MEDIUM FACING SURFACE AND EXTENDING ACROSS MAGNETIC GAP

(75) Inventors: Hiroaki Yoda, Kawasaki; Atsuhito Sawabe, Yokohama; Hitoshi Iwasaki, Yokosuka; Yuichi Ohsawa, Tokyo; Masashi Sahashi; Tadahiko Kobayashi, both of Yokohama, all of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/909,687

(22) Filed: Aug. 12, 1997

Related U.S. Application Data

(63) Continuation of application No. 08/529,045, filed on Sep. 15, 1995, now abandoned.

(30) Foreign Application Priority Data

Sep. 16, 1994 (JP) ............................................. 6-220712

(51) Int. Cl.$^7$ ................................................. G11B 5/39
(52) U.S. Cl. ..................................... 360/321; 360/324.1
(58) Field of Search ................................. 360/113, 321, 360/324.1

(56) References Cited

U.S. PATENT DOCUMENTS 4,068,272 A    1/1978    Kanai et al. ................. 360/113

(List continued on next page.)

FOREIGN PATENT DOCUMENTS

DE    25 36 931    3/1976

(List continued on next page.)

OTHER PUBLICATIONS

K. Yamada et al., "Fabrication Process for High Track Density Yoke MR Heads", IEEE Transactions on Magnetics, 26(5):2406–2408 Sep. (1990).

(List continued on next page.)

*Primary Examiner*—Craig A. Renner
(74) *Attorney, Agent, or Firm*—Finnegan, Henderson, Farabow, Garrett & Dunner, L.L.P.

(57) ABSTRACT

A magneto-resistance effect head records and reproduces recorded magnetic material. The magneto-resistance effect head has a magneto-resistance effect film connected to a pair of leads. Additionally, a magnetic yoke, with a first and second magnetic yoke member, directs a signal magnetic field from a recording medium to the magneto-resistance effect film. The magneto-resistance effect head is constructed such that the first and second magnetic yoke members have surfaces that face the recording medium. The surfaces of the first and second magnetic yoke members have a magnetic gap between them. Additionally, the magneto-resistance effect film is recessed from the medium facing surfaces by a predetermined distance. Moreover, the first and second magnetic yoke members are aligned almost in parallel with the magnetic flux flow from the recording medium to the first magnetic yoke member, the magneto-resistance effect film, and the second magnetic yoke member.

8 Claims, 18 Drawing Sheets

U.S. PATENT DOCUMENTS

| | | | | |
|---|---|---|---|---|
| 4,300,177 A | * | 11/1981 | Koel et al. | 360/113 |
| 4,343,026 A | * | 8/1982 | Griffith et al. | 360/113 |
| 4,356,523 A | * | 10/1982 | Yeh | 360/113 |
| 4,388,662 A | * | 6/1983 | Jeffers et al. | 360/113 |
| 4,644,430 A | * | 2/1987 | French | 360/113 |
| 4,652,945 A | * | 3/1987 | Marchant | 360/113 |
| 4,698,711 A | * | 10/1987 | Vinal | 360/113 |
| 4,954,920 A | * | 9/1990 | Yamada et al. | 360/113 |
| 5,079,662 A | * | 1/1992 | Kawakami et al. | 360/113 |
| 5,095,397 A | * | 3/1992 | Nagata et al. | 360/113 |
| 5,255,141 A | * | 10/1993 | Valstyn et al. | 360/113 |
| 5,331,492 A | * | 7/1994 | Komai et al. | 360/113 |
| 5,486,967 A | * | 1/1996 | Tanaka et al. | 360/113 |
| 5,493,467 A | * | 2/1996 | Cain et al. | 360/113 |

FOREIGN PATENT DOCUMENTS

| | | | |
|---|---|---|---|
| EP | 0220385 | | 5/1987 |
| EP | 0262925 | | 4/1988 |
| EP | 0269129 | | 6/1988 |
| EP | 0490327 | | 6/1992 |
| JP | 53-049415 | | 5/1978 |
| JP | 58-1831 | | 1/1983 |
| JP | 58-12125 | | 1/1983 |
| JP | 62-71016 | | 4/1987 |
| JP | 02-105315 | | 4/1990 |
| JP | 05-242433 | * | 9/1993 |

OTHER PUBLICATIONS

Patent Abstracts of Japan, vol. 11, No. 291 (P–618), Sep. 19, 1987 (JP–A–62–086521).

Patent Abstracts of Japan, vol. 13, No. 19 (P–814), Jan. 18, 1989 (JP–A–63–224016).

Patent Abstracts of Japan, vol. 12, No. 16 (P–656), Jan. 19, 1988 (JP–A–62–172515).

Patent Abstracts of Japan, vol. 17, No. 366 (P–1571), Jul. 9, 1993 (JP–A–05–054340).

Patent Abstracts of Japan, vol. 18, No. 494 (P–1800), Sep. 14, 1994 (JP–A–06–162437).

Shibaya, H., History of Thin Alloy Film for Magnetic Recording Head Aiming at High Density and Wide Band Recording, IEEE Transl. Journal on Magnetics in Japan, vol. 3 No. 5, May 1988 New York, New York, U.S.A., pp. 399–406.

Patent Abstracts of Japan, vol. 13, No. 530 (P–966), Nov. 27, 1989 (JP–A–01–217718, Aug. 31, 1989).

Patent Abstracts of Japan, vol. 7, No. 202 (P–221), Sep. 7, 1983 (JP–A–58–100215, Jun. 14, 1983).

Patent Abstracts of Japan, vol. 12, No. 147 (P–698), May 7, 1988 (JP–A–62–266720, Nov. 19, 1987).

Patent Abstracts of Japan, vol. 7, No. 70 (P–185), Mar. 23, 1983 (JP–A–58–001831, Jan. 7, 1983).

* cited by examiner

SURFACE FOR FORMING ELECTROMAGNETIC CONVERSION PART

W1 > W2

SURFACE FOR FORMING ELECTROMAGNETIC CONVERSION PART

YOKE-TYPE HEAD WITH MAGNETO-RESISTANCE EFFECT FILM RECESSED FROM MEDIUM FACING SURFACE AND EXTENDING ACROSS MAGNETIC GAP

This application is a continuation of application Ser. No. 08/529,045 filed Sep. 15, 1995, now abandoned.

BACKGROUND OF THE INVENTION

1. Field of the Invention

The present invention relates to a magneto-resistance effect head used as a reproducing head of a magnetic recording/reproducing apparatus and a magnetic recording/reproducing head thereof.

2. Description of the Related Art

In recent years, high density recording systems such as a VCR with a recording density of 500 MB/inch$^2$ and a HDD with a recording density of 200 MB/inch$^2$ have been practically used. In addition, increase of the recording density is further being required. As a reproducing head for use with such high density systems, a magneto-resistance effect head (hereinafter referred to as an MR head) using a magneto-resistance effect of which the electric resistance of such as a magnetic thin film, a magnetic multi-layer thin film, or the like varies by an external magnetic field is becoming attractive.

FIG. 22 is a perspective view showing a construction of a conventional shield type MR head. In FIG. 22, reference numeral 1 is a substrate composed of Al$_2$O$_3$.TiC or the like. A lower shield layer 3 is disposed on the substrate 1 through an insulation layer 2. The shield layer 3 is composed of permalloy or the like. The insulation layer 2 is composed of Al$_2$O$_3$ or the like. A magneto-resistance effect film (hereinafter referred to as an MR film) is disposed on the lower shield layer 3 through an insulation film 4. The insulation film 4 forms a reproducing magnetic gap. A pair of leads 6 are connected to both edges of the MR film 5. As a result, a magneto-resistance effect device 7 (hereinafter referred to as an MR device) is formed. An upper shield layer 9 is disposed on the MR device 7 through an insulation film 8. The insulation film 8 forms a reproducing magnetic gap. A signal magnetic field is detected by the shield type MR head in the following manner. A sense current is supplied to the leads 6 and then the device resistance that varies corresponding to the variation of the direction of the average magnetization of the MR film 5 is measured.

When a signal magnetic field of for example a metal type recording medium is detected by the above-described shield type MR head, the MR head tends to short-circuit the metal type medium. Thus, a large amount of current flows in the MR device 7, thereby destroying the MR head. In addition, when the MR film 5 is machined in the depth direction, the MR film 5 directly comes in contact with an abrasive solution or the like. During the process, the MR film 5 gets corroded.

On the other hand, to prevent the above-described shield type MR head from short-circuiting the metal medium, an insulation protecting film is disposed on the medium opposite surface of the MR head and the medium front surface. However, this method is improper for a low flying that is necessary for improving the linear recording density. In addition, when a contact recording method that is becoming attractive as a future high density recording technology is used, since the medium opposite surface wears out and thereby the protecting film is lost. Thus, to solve such a problem, proper countermeasures should be taken.

Moreover, when the MR device 7 wears out, the width in the depth direction varies and thereby the head output fluctuates. In this case, the MR film 5 may wear out and thereby it is lost.

As a head construction that prevents such a problem of the above-described shield type MR head, a so-called yoke type MR head as shown in FIG. 23 is known. In this yoke type MR head, the magnetic yoke 10 directs a signal magnetic field to the MR device 7 that is disposed in the head. In the yoke type MR head, the MR device 7 is disposed on a soft magnetic substance layer 11 that is a part of the magnetic yoke 10 through an insulation film 12 that is a magnetic gap. Soft magnetic substances 13 and 14 that are a part of the magnetic yoke are connected from the medium opposite surface to the soft magnetic substance layer 11 in the head through the MR film 5. In the yoke type MR head, the reproduced output decreases depending on the position of the MR device 7 and the connection of the magnetic yoke 10. In addition, these overlap lengths L$_{ov}$ fluctuate due to an alignment error between each of the soft magnetic substances 13 and 14 that is a part of the magnetic yoke and the MR film 5, and thereby the reproduced output fluctuates. Thus, it is difficult to produce MR heads with equal characteristics at a high yield rate.

On the other hand, a structure as shown in FIG. 24 has been disclosed. In this structure, a magnetic core 15 is disposed in the layer direction of the substrate 1. The MR device 7 is disposed in the magnetic core 15. The magnetic permeability in the direction of the film thickness of the magnetic core 15 is almost zero. In addition, the MR device 7 is recessed from the medium facing surface for the film thickness of the magnetic core 15. Thus, the reproduced output decreases. Moreover, since the production process of a magnetic yoke for such a yoke type MR head is complicated, it is difficult to reduce the production cost.

As described above, in the conventional shield type MR head, due to a short-circuit with the metal medium, the head is destroyed. In addition, during the production process, the MR film gets corroded. Due to wear-out of the MR device, the depth thereof varies. Thereby, the head output fluctuates and the MR film is lost. On the other hand, the reproduced output of the conventional yoke type MR head is small and fluctuates. In addition, the production process of the MR head is complicated and the production cost cannot be easily reduced.

SUMMARY OF THE INVENTION

The present invention is made from the above-described point of view. An object of the present invention is to provide a magneto-resistance effect head and a magnetic recording/reproducing head thereof for suppressing the fluctuation of the reproduced output due to the fluctuation of the depth and overlap length of the yoke to the MR film and for obtaining a good reproduced output at a low cost.

A first aspect of the present invention is a magneto-resistance effect head, comprising a magnetic yoke comprising a first magnetic yoke member and a second magnetic yoke member, wherein the first and second magnetic yoke members are disposed with a magnetic gap being between the first and second yoke members at a medium facing surface of the magnetic yoke, a magneto-resistance effect film connected to a pair of leads and disposed on a major surface of the magnetic yoke members at a position recessed from the medium facing surface by a predetermined distance, and the major surface being substantially in parallel with a magnetic flow from the recording medium to the first magnetic yoke member, the magneto-resistance film, and the second magnetic yoke member in this order.

A second aspect of the present invention is a magnetic recording/reproducing head, comprising a reproducing head constructed of the magneto-resistance effect head of the first aspect of the present invention, and a recording head including a magnetic core and a recording coil disposed through a magnetic gap and is constructed of an induction type magnetic head having a magnetic core and a magnetic gap that are shared with the magnetic yoke and the magnetic gap of the magneto-resistance effect head.

According to the magneto-resistance effect head of the present invention, since the magneto-resistance effect film is disposed on a plane of a magnetic yoke composed of a pair of magnetic substance (for example, along the upper surface of the magnetic yoke in the layer direction), a magneto-resistance effect film can be disposed at a position as close as possible to and recessed from the medium facing surface (namely, at a position adjacent to the medium facing surface). Thus, without loosing the advantages of the yoke type magneto-resistance effect head, much magnetic flux can be directed to the magneto-resistance effect film so as to obtain a highly reproduced output. Even if the medium comes in contact with the head and thereby the head wears out, the fluctuation of the output can be reduced as described later. Thus, since the overlap length between each of the magnetic substances that are the magnetic yoke and the magneto-resistance effect film can be satisfactorily large regardless of the recess position of the magneto-resistance effect film from the medium facing surface, the fluctuation of the reproduced output can be reduced.

Moreover, since the track-width is defined by the thickness of the yoke, narrow track of 1 µm or less can be easily fabricated by using the film yoke.

The recording head and the reproducing head of the magnetic recording/reproducing head of the present invention can share the magnetic gap and at least a part of the magnetic head of the magneto-resistance effect head and the magnetic core of the induction type magnetic head. Thus, the track width and the gap length in the recording operation are the same as those in the reproducing operation. Consequently, since the alignment error between the recording and reproducing operations becomes zero, the recording/reproducing characteristics of for example a high density recording system can be improved.

These and other objects, features and advantages of the present invention will become more apparent in light of the following detailed description of best mode embodiments thereof, as illustrated in the accompanying drawings.

DESCRIPTION OF THE PREFERRED EMBODIMENTS

Next, embodiments of the present invention will be described in detail.

Figure 1:
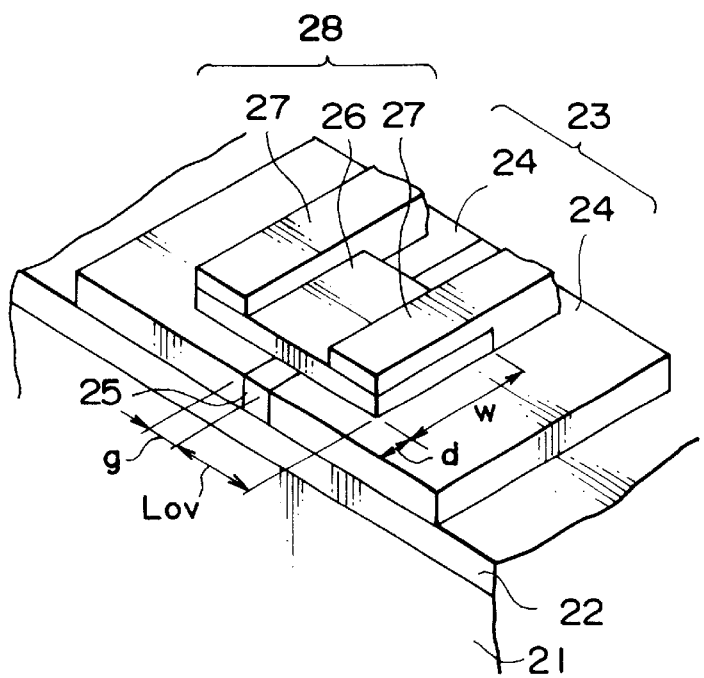
FIG. 1 is a perspective view showing an outlined construction of a yoke type magneto-resistance effect head according to an embodiment of the present invention.
Figure 2A:
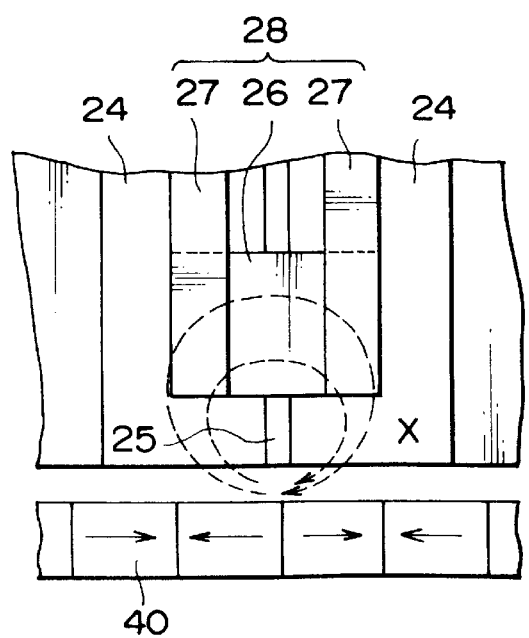
FIG. 2A is a plan view showing the relation of the positions of the yoke type magneto-resistance effect head shown in FIG. 1 and a recording medium.
Figure 2B:
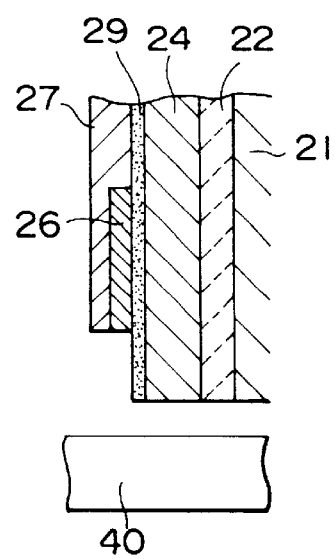
FIG. 2B is a horizontal sectional view shown in FIG. 2A.

FIGS. 1 and 2 show a construction of a magneto-resistance effect head (referred to as an MR head) according to an embodiment of the present invention. FIG. 1 is a perspective view of the magneto-resistance effect head viewed from a medium facing surface. FIG. 2A is a plane view showing the relation of the positions of the magneto-resistance effect head and a recording medium 40. FIG. 2B is a sectional view shown in FIG. 2A.

In FIGS. 1, 2A, and 2B, reference numeral 21 is a substrate composed of $Al_2O_3.TiC$ or the like. An insulation layer 22 is disposed on the substrate 21. The insulation layer 22 is composed of $Al_2O_3$ or the like. A pair of magnetic substances 24 that construct a magnetic yoke 23 are disposed on the insulation layer 22 with a magnetic gap 25 being between the pair of magnetic substances 24 in such a manner that the magnetic substances 24 form the same plane. The magnetic gap 25 is composed of $Al_2O_3$ or the like. In other words, the magnetic substances 24, which construct the magnetic yoke 23, and the magnetic gap 25 are disposed on the same plane of the substrate through the insulation layer 22. The magnetic substances 24 are composed of a soft magnetic material (for example, NiFe alloy), an amorphous alloy (for example, CoZrNb), or the like. As a necessary condition, the magnetic gap 25, which is composed of $Al_2O_3$ or the like, is disposed at least between the medium opposite surfaces of the magnetic substances 24. The magnetic gap 25 disposed between the magnetic substances 24 is suitable for a narrow gap construction.

A magneto-resistance effect film (referred to as an MR film) 26 is disposed on a plane almost in parallel with a magnetic flux that passes through the magnetic yoke 23 (namely, a magnetic circuit (denoted by an arrow x of FIG. 2A) at a position recessed from the medium facing surface by a predetermined distance. In other words, the MR film 26 is disposed on a plane equivalent to the upper surface of the layer direction of the magnetic substances 24 so that the MR film 26 is magnetically connected to the magnetic substances 24 through the magnetic gap 25. The longitudinal direction of the MR film 26 is almost in parallel with the direction of a signal magnetic field directed by the magnetic circuit of the magnetic yoke 23.

The MR film 26 is preferably disposed adjacent to the medium facing surface in consideration of the short-circuit with the recording medium 40, wear-out, and the like. According to the relation of the positions of the magnetic yoke 23 and the MR film 26, the MR film 26 can be accurately disposed at a position adjacent to the medium facing surface with a minimum recess therefrom (namely, the advantages of the yoke type MR head are not lost). The recess distance d of the MR film 26 from the medium facing surface is preferably in the range from 0.2 to 10 μm although it depends on the directing amount of the designated signal magnetic field.

Examples of the MR film 26 are an anisotropy magneto-resistance effect film, a spin valve film, and an artificial lattice film. The anisotropy magneto-resistance effect film is composed of $Ni_{80}Fe_{20}$ or the like of which the electric resistance thereof varies corresponding to the angle of the direction of current and the magnetizing moment of the magnetic layer. The spin valve film has a layer structure of a magnetic film and a non-magnetic film of $Co_{90}Fe_{10}$/Cu/$Co_{90}Fe_{10}$ that represents a so-called spin valve effect of which the electric resistance thereof varies corresponding to the angle of each magnetic layer to the magnetization. The artificial lattice film represents a giant magneto-resistance effect.

A pair of leads 27 are disposed on the MR film 26. The leads 27 are composed of Cu or the like and electrically connected to the MR film 26. As a result, an MR device 28 is constructed. The leads 27 are disposed so that a sense current flows in the longitudinal direction of the MR film 26 that is nearly in parallel with the magnetic circuit produced by the magnetic yoke. As shown in FIG. 2B (not shown in FIG. 1), an insulation film 29 is disposed between each of the magnetic substances 24 and the MR film 26. The MR device 28 is insulated from the magnetic yoke 23. This construction applies to other embodiments of the present invention.

The above-described magneto-resistance effect head is produced in for example the following steps.

Figure 3A:
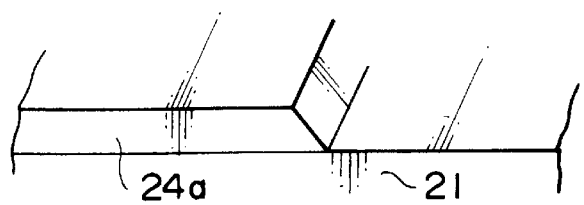
FIGS. 3A, 3B, 3C, 3D, 3E, and 3F are schematic diagrams for explaining a production method of the magneto-resistance effect head according to the present invention.
Figure 3B:
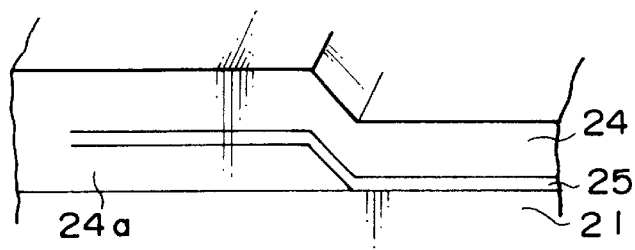
Figure 3C:
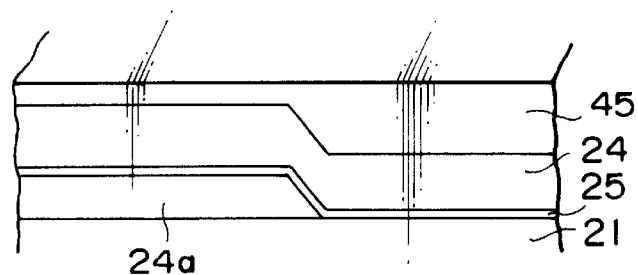
Figure 3D:
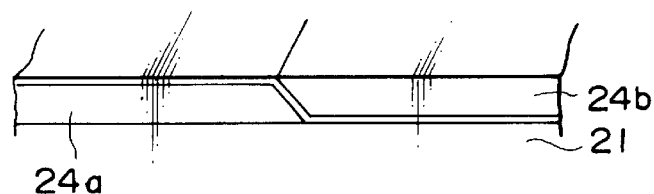
Figure 3E:
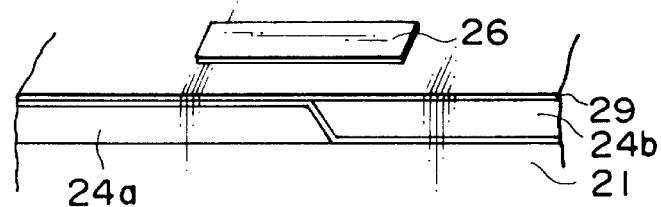
Figure 3F:
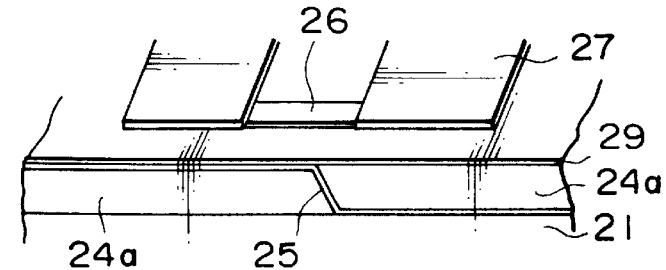

First, a soft magnetic material film composed of NiFe or CoZrNb is formed on a substrate 21 composed of AlOx/AlOx.TiC or the like. Thereafter, an ion beam is radiated to the resultant structure with a resist mask. As a result, a yoke member 24a is formed (see FIG. 3A). Thereafter, a non-magnetic film 25 composed of AlOx or SiOx and a soft magnetic material film 24 are successively formed on the resultant structure (see FIG. 3B). A resist 45 with a small molecular weight is coated on the resultant structure and then baked so that the surface of the resultant structure becomes smooth (see FIG. 3C). Thereafter, for example an ion incident angle is designated so that the resist 5 and the yoke material 24 are etched out at the same etching rate. An ion beam is radiated to the resultant structure so as to form a yoke member 24b (see FIG. 3D). An insulation film 29 composed of AlOx or the like is formed on the front surface of the resultant structure. An MR film or a spin valve film 26 is formed on the front surface of the resultant structure (see FIG. 3E). Lastly, leads 27 composed of Ti/Cu/Ti or the like are formed by lift-off process or the like (see FIG. 3F).

Figure 4:
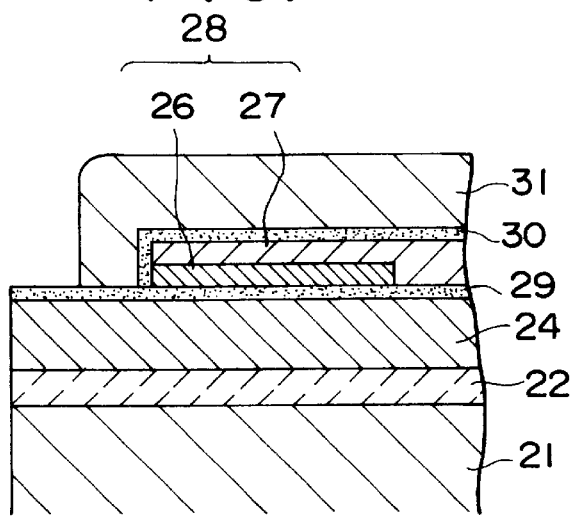
FIG. 4 is a sectional view showing a magnetic shield layer disposed in the yoke type magneto-resistance effect head shown in FIG. 1.

As shown in FIG. 4, the MR device 28 is preferably covered by a magnetic shield layer 31 through an insulation film 30. Thus, the MR device 28 can be prevented from being affected by noise due to outer disturbance magnetic field. In addition, when the magnetic shield layer 31 is recessed from the medium opposite surface for around 0.5 μm, the magnetic shield layer 31 prevents the MR film 26 from being affected by a signal magnetic field of an adjacent track. Thus, the MR device 28 can be further prevented from being affected by noise.

In the above-described MR head, since the MR film 26 can be accurately disposed at the position recessed from the medium facing surface by the predetermined distance (namely, at the position adjacent to the medium opposite surface), much signal magnetic field can be directed to the MR device 28. Thus, the output decrease that is one of the disadvantages of the conventional yoke type MR head can be prevented. In addition, the overlap length $L_{OV}'$ (see FIG. 1) between each of the magnetic substances 24, which construct the magnetic yoke 23, and the MR film 26 can be designated regardless of the distance of the MR film 26 to the medium facing surface, the fluctuation of the reproduced output can be reduced. Next, the effect of the present invention will be quantitatively described.

When the medium magnetic flux is sucked by the magnetic substances 24 (thicknesses $t_1$ and $t_2$; magnetic permeabilities ($\mu_1$ and $\mu_2$) that are opposed with the magnetic gap 25 (width: g), the density of the magnetic flux that passes through the magnetic substances attenuates in proportion to the distance from the medium opposite surface. The distance of which the density of magnetic flux that passes through the magnetic substances attenuates to 1/e of the value at the edge of the magnetic substance is denoted by λ and referred to as a characteristic length, where "e" is the base of natural logarithms. The distance λ can be expressed by the following equation.

$$1\lambda \sim (1/g\mu_1 t_1 + 1/g\mu_2 t_2)^{0.5}$$

For example, in the case that the recording density is 1 GB/inch$^2$, for the yoke type MR head shown in FIG. 1, since g=0.25 $\mu$m, $t_1=t_2$=2 $\mu$m, and $\mu_1=\mu_2$=1000, the characteristic length $\lambda$ is around 16 $\mu$m. Thus, in the above-described MR head, even if the MR film 26 is recessed from the medium facing surface by around 1.0 $\mu$m, most of the magnetic flux that flows in the head can be directed to the MR device 28. As a result, basically, the output is not decreased. Even if the head wears out for around 0.5 $\mu$m, the influence is small. In other words, the magnetic flux that flows in the head slightly increases. Thus, the output fluctuation can be almost ignored. In addition, since the overlap length $L_{OV}'$ between each of the magnetic substances 24 and the MR film 26 can be large regardless of the distance of the MR film 26 from the medium facing surface, the fluctuation of the reproduced output is small.

Figure 5:
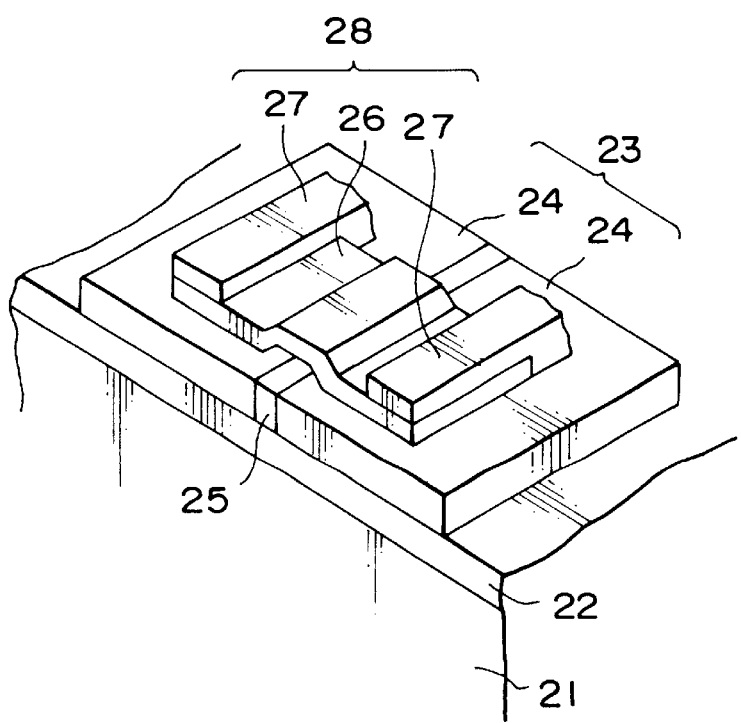
FIG. 5 is a perspective view showing a modification example of the yoke type magneto-resistance effect head shown in FIG. 1.

In the above-described yoke type MR head, since much magnetic flux flows to the MR device 28, most portions of the MR device 28 may saturate with a magnetic field. Thus, a resistance fluctuation results in a saturation from the media with large Mr·$\delta$ where Mr is remnant magnetisation, $\delta$ is the thickness of the media. In this case, as shown in FIG. 5, a center portion of the MR film 26 is bent so as to widen the gap between the MR film 26 and the magnetic yoke 23 so as to adjust the amount of the magnetic flux that flows in the MR film, resulting in suppressing the saturation due to the resistance variation.

Figure 6:
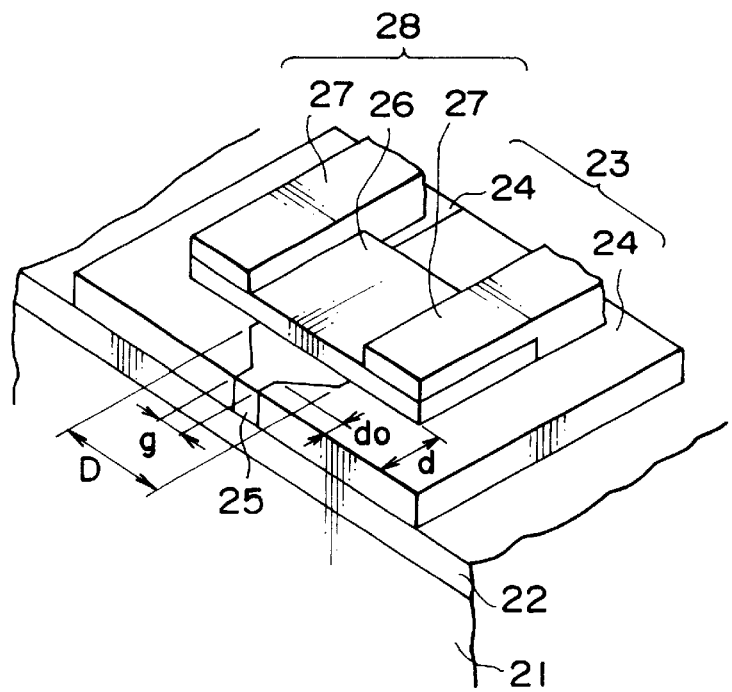
FIG. 6 is a perspective view showing another modification example of the yoke type magneto-resistance effect head shown in FIG. 1.

Moreover, as shown in FIG. 6, when the gap between the magnetic substances 24 (which is a substantial magnetic gap) is a narrow gap g and the width D at which the MR film 26 is disposed wide, the distance between the leads of the MR device 28 can be made as large as D, then the resistance get large to get high output. In addition, when the distance D between the magnetic substances is as large as 0.5 to 1.0 $\mu$m with a narrow gap g (for example 0.05–0.2 $\mu$m), the portion that is not saturated by the medium magnetic field becomes large. Thus, the saturation due to the resistance variation can be suppressed. Consequently, an MR head with a good linear characteristic can be accomplished.

Next, as an example of the yoke type MR head shown in FIG. 6, quantitatively evaluated results of the amount of magnetic flux that flows in the yoke type MR head according to the present invention will be described. In the yoke type MR head shown in FIG. 6, when the gap distance g between medium facing surfaces is denoted 0.1 $\mu$m, the depth d thereof is 5 $\mu$m (wherein do is approximately 5 $\mu$m), the thickness of the MR film 26 is 0.02 $\mu$m, and the distance D of the magnetic substances 24 at the position of the MR device 28 is 1 $\mu$m, the device magnetic resistance $R_{MR}$ and the gap magnetic resistance $R_1$ can be obtained from the following equations. The magnetic permeability of MR is 500.

$$R_{MR} \times 10^{-4} = 1/(500 \times 0.02 \times 1) = 1/10$$

$$R_1 \times 10^{-4} = 0.1/(1 \times 5 \times 1) = 1/50$$

Figure 22:
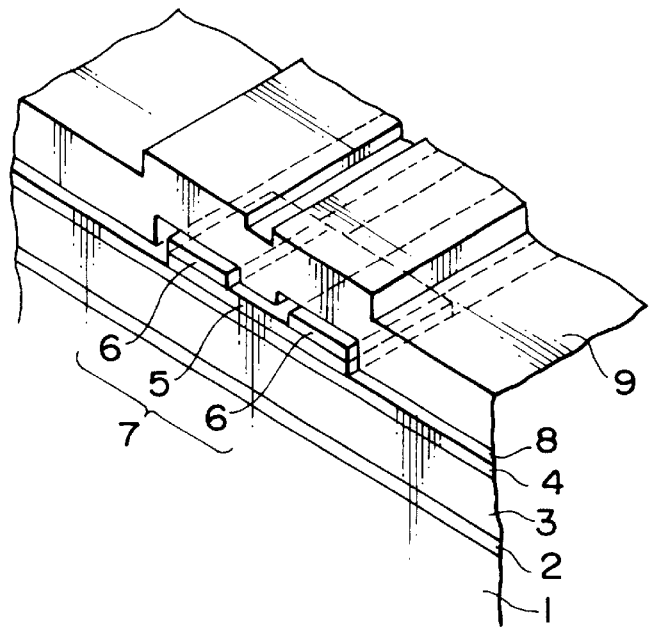
FIG. 22 is a perspective view showing an outlined construction of a conventional shield type magneto-resistance effect head.
Figure 23:
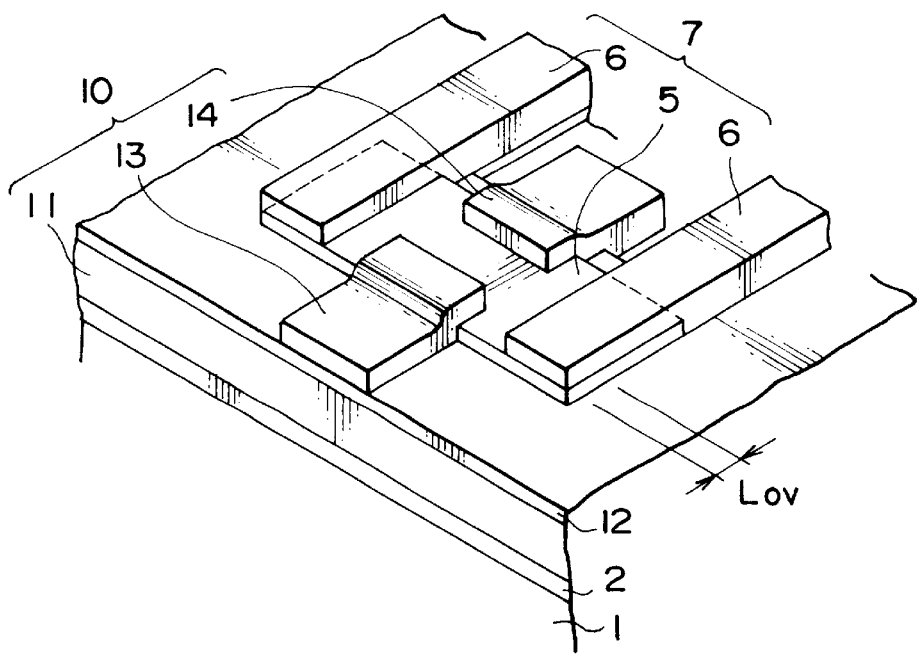
FIG. 23 is a perspective view showing an outlined construction of a conventional yoke type magneto-resistance effect head.
Figure 24:
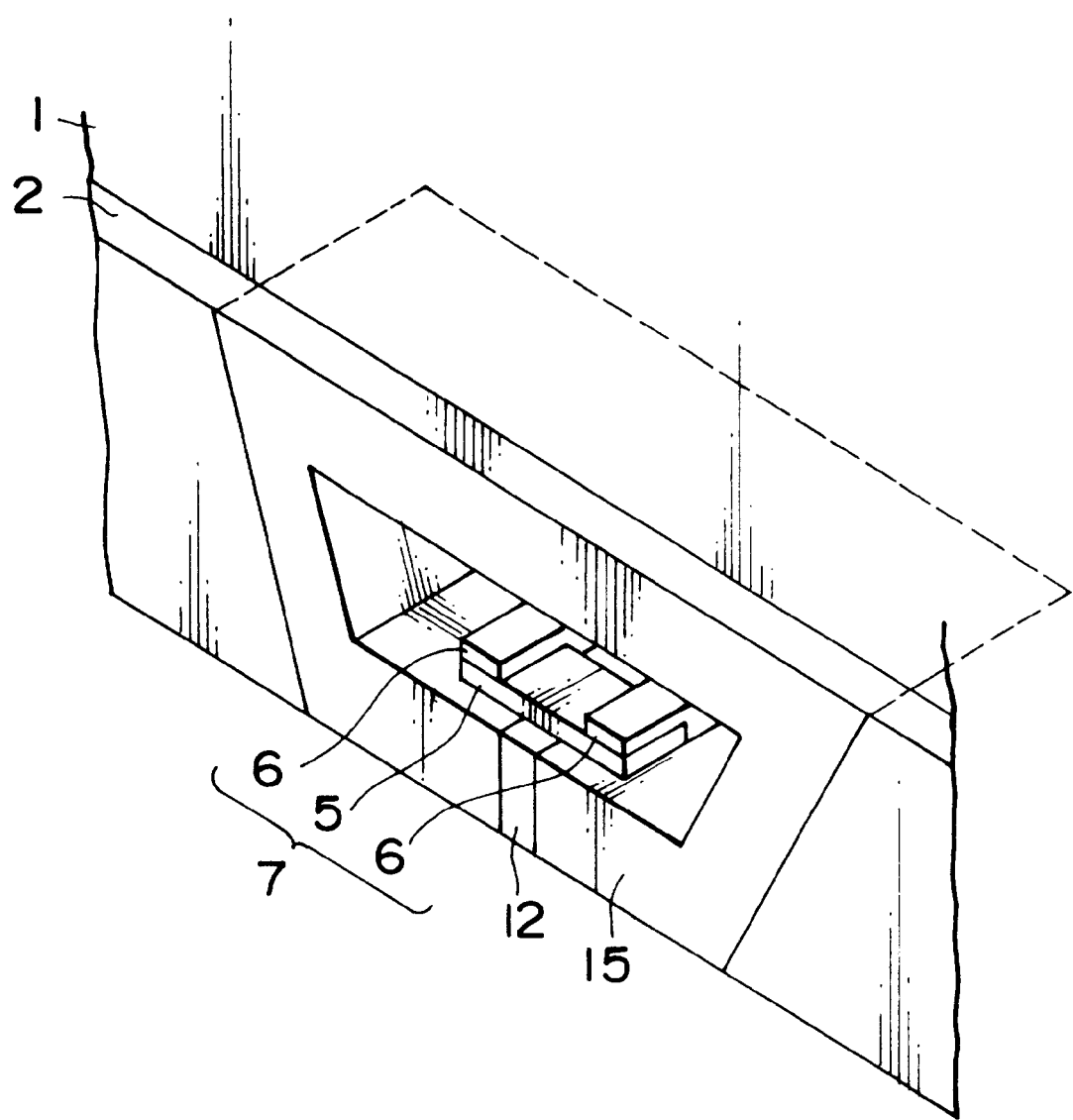
FIG. 24 is a perspective view showing an outlined construction of another conventional yoke type magneto-resistance effect head.

Thus, the average magnetic flux amount $\phi_{MR}$ which flows in the MR device can be obtained from the following equation assuming that the magnetomotive force between the magnetic substances is 1.

$$\phi_{MR} \times 10^4 \ \{1/(1/50)\} \times \{(1/50)/[(1/50)+(1/10)]\} \ 8$$

$$\phi_{MR} \ 8 \times 10^{-4}$$

where
R=1/$\mu$s
l=length of the magnetic circuit
s=area of the cross section
$\mu$=magnetic permeability On the other hand, as shown in FIG. 22, in the conventional yoke type MR head, when the overlap length $L_{ov}$ of the yoke and the MR film is 0.1 $\mu$m and the depth d of the magnetic gap portion is 5 $\mu$m, $r_{OV}$ is 1×10$^{-4}$ and $R_g \times 10^{-4}$ is 1/50. Thus, the average magnetic flux amount $\phi_{YMR}$ that flows in the MR device is 0.5×10$^{-4}$. When the overlap length $L_{OV}$ of the yoke to the MR film is as large as 0.2 $\mu$m, assuming that the magnetomotive force is 1, the average magnetic flux amount $\phi_{YMR}$ is approximately 1×10$^{-4}$. Thus, it is clear that a small alignment error results in a large fluctuation of the reproduced output.

As described above, according to the yoke type MR head of the present invention, more magnetic flux can be directed to the MR device than the conventional yoke type MR head and the conventional shield type MR head. This result is not limited to the yoke type MR head shown in FIG. 6. Instead, the same effect can be obtained with the another yoke type MR head of the present invention. For example, in the yoke type MR head shown in FIG. 1, when the gap distance g between the medium facing surfaces is 0.1 $\mu$m, the distance d of the MR device 28 to the medium facing surface is 5 $\mu$m, and the width w of the MR device 28 is 1 $\mu$m, assuming that the magnetomotive force between the magnetic substances is 1, the average magnetic flux amount $\phi_{MR}$ that flows in the MR device 28 can be expressed by the following equation.

$$\phi_{MR} \times 10^4 \ \{1/(1/60)\} \times \{(1/60)/[(1/60)+(1/10)]\} \ 8$$

$$\phi_{MR} \ 8 \times 10^{-4}$$

Figure 7:
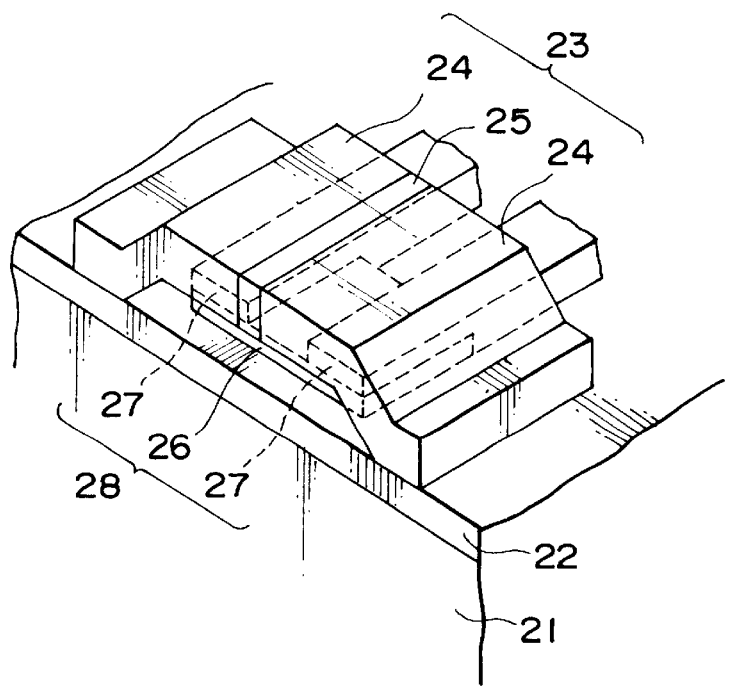
FIG. 7 is a perspective view showing an outlined construction of a magneto-resistance effect head according to another embodiment of the present invention.

In the above-described embodiment, the construction of which the MR device 28 is disposed on the magnetic yoke 23 (namely, the magnetic substances) was described. However, the present invention is not limited to such a construction. Instead, the same effect can be obtained in the case that the magnetic yoke 23 is disposed on the MR device 28. For example, as shown in FIG. 7, in the construction of which the MR device 28 (the MR film 26 and the leads 27) is disposed on the insulation layer 22 of the substrate 21 at a position recessed from the medium facing surface by a predetermined distance and the magnetic yoke 23 constructed of magnetic substances 24 partially bent in the film thickness direction and the magnetic gap 25 is disposed on the MR device 28, the same effect as each of the above-described embodiments can be accomplished. In this construction, since the MR device 28 can be disposed on a smooth surface of a substrate, the MR device 28 can suppress an occurrence of magnetic domain walls. In addition, a film at the stair portion can be prevented from being broken.

However, when an isotropic magnetic film is used for a yoke film, the magnetic permeability decreases to 500 or less in high frequency range. In contrast, when anisotropic magnetic field is as large as 10 Oe, the magnetic permeability decreases to 500 or less in all frequency range.

When a material with a low specific resistance such as NiFe is used, the magnetic permeability in the high frequency range becomes around 300 due to an eddy current loss. In an extreme case, the magnetic permeability becomes 100 or less. In this case, even if the basic construction of the present invention is used, the value of $\lambda$ is on the order of several $\lambda$.m.

Thus, in this case, it is preferable to decrease the recess distance d of the (G) MR device shown in FIG. 1. In reality, to direct the magnetic flux to the entire region of the (G) MR, it is preferable to decrease the value of (d+w). When (d+w)<λ., the magnetic flux can be necessarily and satisfactorily directed to the (G) MR.

Next, with reference to FIGS. 8 and 9, another embodiment of the present invention will be described.

Figure 8:
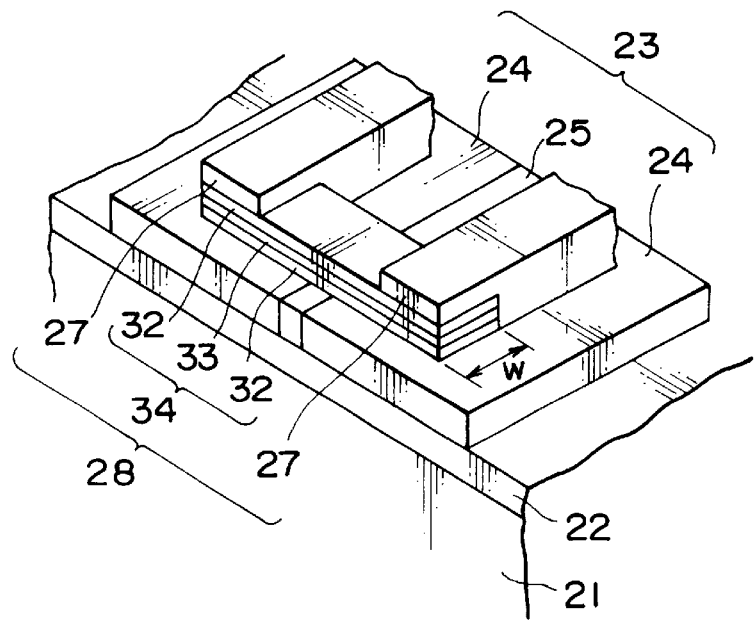
FIG. 8 is a perspective view showing an outlined construction of a magneto-resistance effect head according to a further other embodiment of the present invention.

In the yoke type MR head shown in FIG. 8, a three-layer structure MR film 34 composed of a pair of magnetic films 32 and a non-magnetic film 33 interposed between the pair of magnetic film. In addition, the MR film 34 is disposed in such a manner that the sense current direction of the MR film 34 becomes almost in parallel with the direction of the magnetic flux produced by the magnetic circuit.

As the width w of the MR film 34 is small, the amount of magnetic flux (signal magnetic field) per unit width directed to the MR device 28 can be increased. Thus, the reproduced output is improved. In addition, the MR device 28 is preferably magnetized from the parallel direction of the width of the MR film 34 to the longitudinal direction (the direction of the magnetic flux produced by the magnetic circuit). However, when the MR device is constructed of a single magnetic layer, the magnetization curls in the edge in the width direction. Thus, when the width of the MR film is decreased, the MR device is not magnetized in parallel with the width direction.

On the other hand, in the case that the three-layer structure MR film 34 shown in FIG. 8 is used, when the MR device 28 is disposed in such a manner that the direction of the sense current becomes almost in parallel with the direction of the magnetic flux, even if the width w of the MR film 34 is as small as around 3 μm, the magnetic film 32 can be magnetized from the parallel direction of the width to the longitudinal direction. Thus, the direction of the magnetization of the MR film 34 can be properly varied. In addition, the width w of the MR film 34 can be decreased. Consequently, the magnetic flux directed to the MR device 28 per unit width can be increased. Consequently, a large reproduced output can be obtained. At this point, a spin valve film is very suitable for this head.

Figure 9:
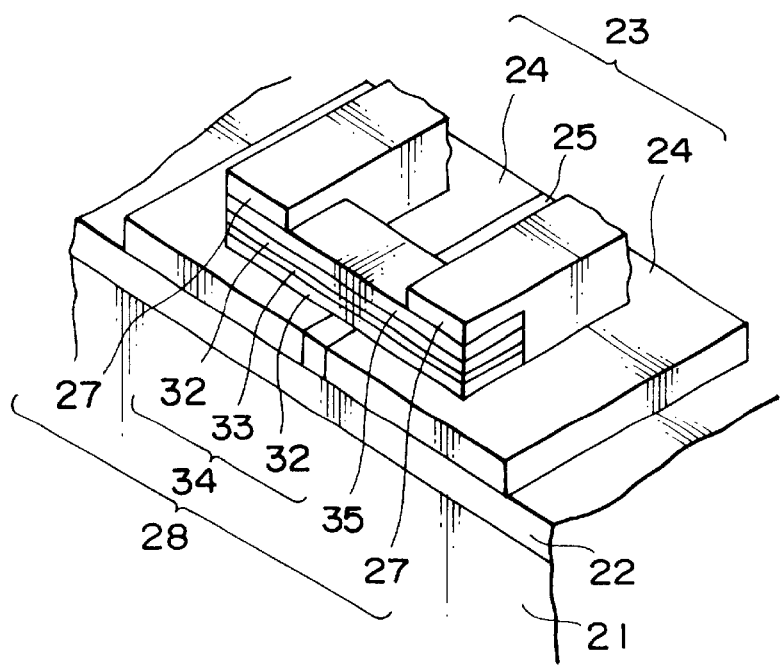
FIG. 9 is a perspective view showing a modification example of the magneto-resistance effect head shown in FIG. 8.

In a construction shown in FIG. 9, a magnetization fixing layer 35 is connected to one of the magnetic films 32 of the three-layer structure MR film 34. In addition, the fixing direction of the magnetization by the magnetization fixing layer 35 becomes in parallel with the direction of the magnetic flux produced by the magnetic circuit. Moreover, when an anisotropic characteristic is provided or a bias is applied, the linear characteristic of the response to the magnetic field of the medium can be improved. Furthermore, since the magnetic permeability becomes large, the high frequency output can be increased.

Figure 10:
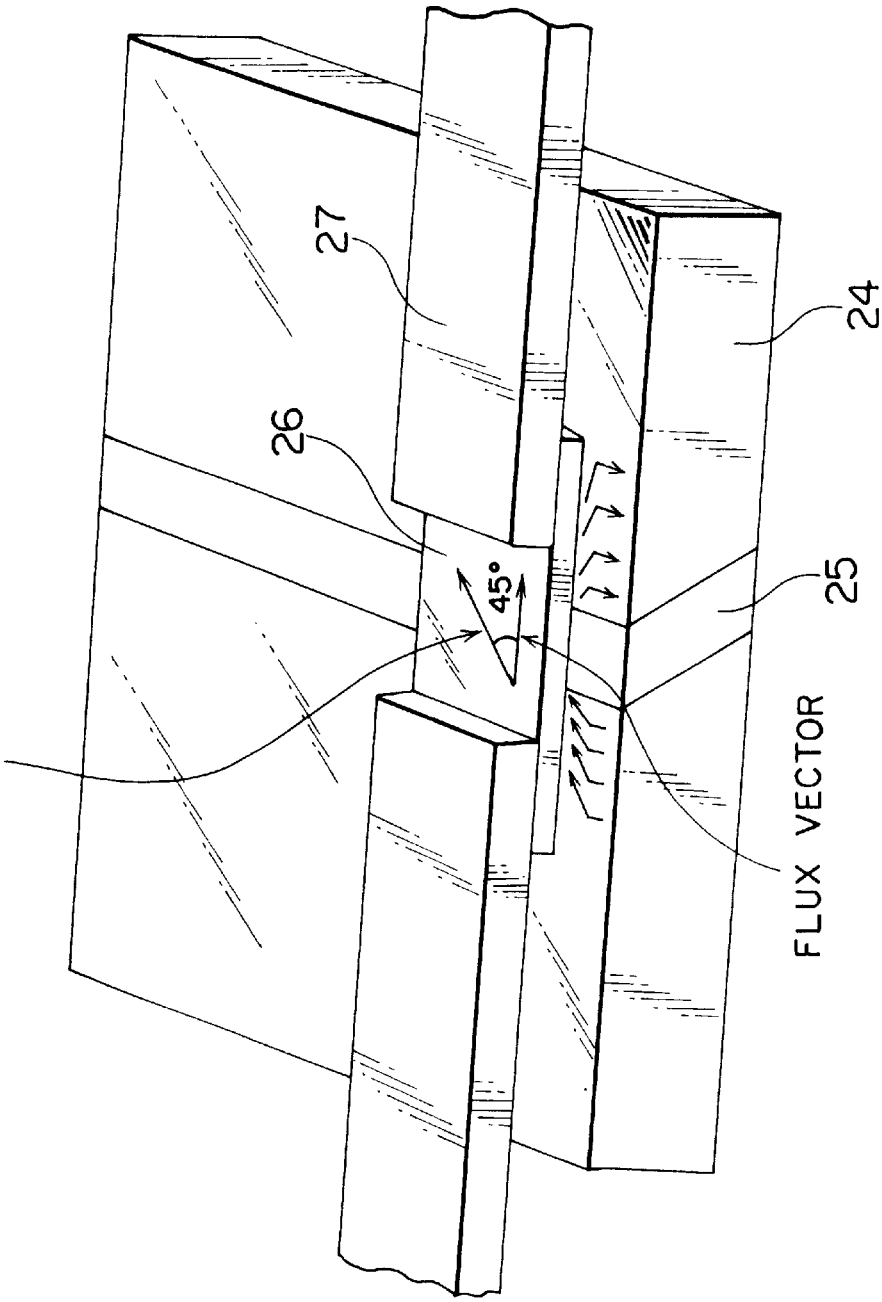
FIG. 10 is a perspective view showing a modification example of the magneto-resistance effective head.

In MR head, a magnetic moment of a magneto-resistive layer is bias at 45 degree against the vector of a magnetic flux to get linear output. But in this invention, the flux enter the magneto-resistive layer at various angles, so lineality of the output is deteriorated. For example, at left region of the MR element in FIG. 10, the magnetic flux is parallel to the magnetic moment of the magneto-resistive layer, then permeability becomes almost zero. The coil 39 in FIG. 10 is made of one turn. Plural turns may also be used.

Figure 11:
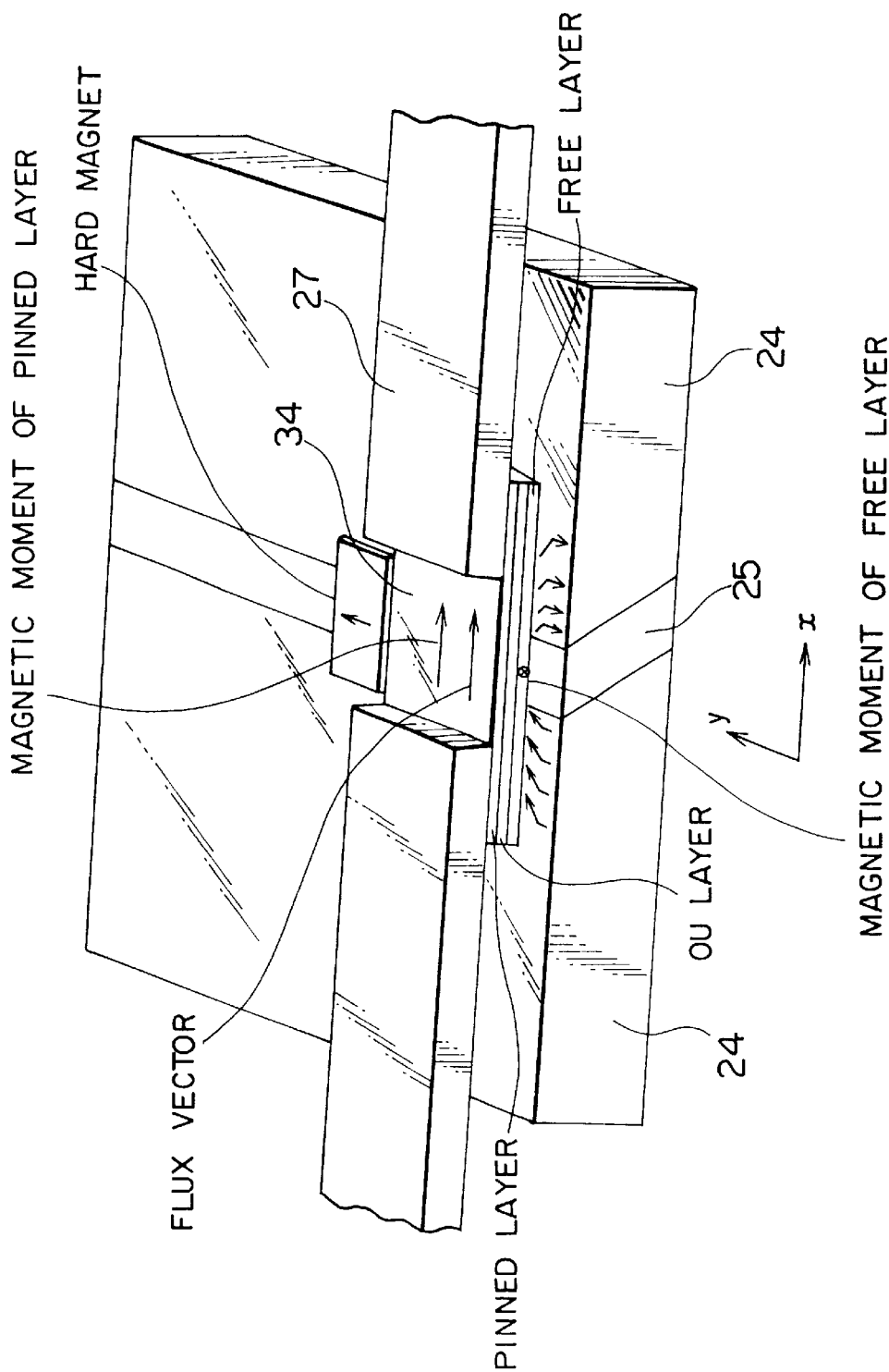
FIG. 11 is a perspective view showing a modification example of the magneto-resistance effective head.
Figure 12:
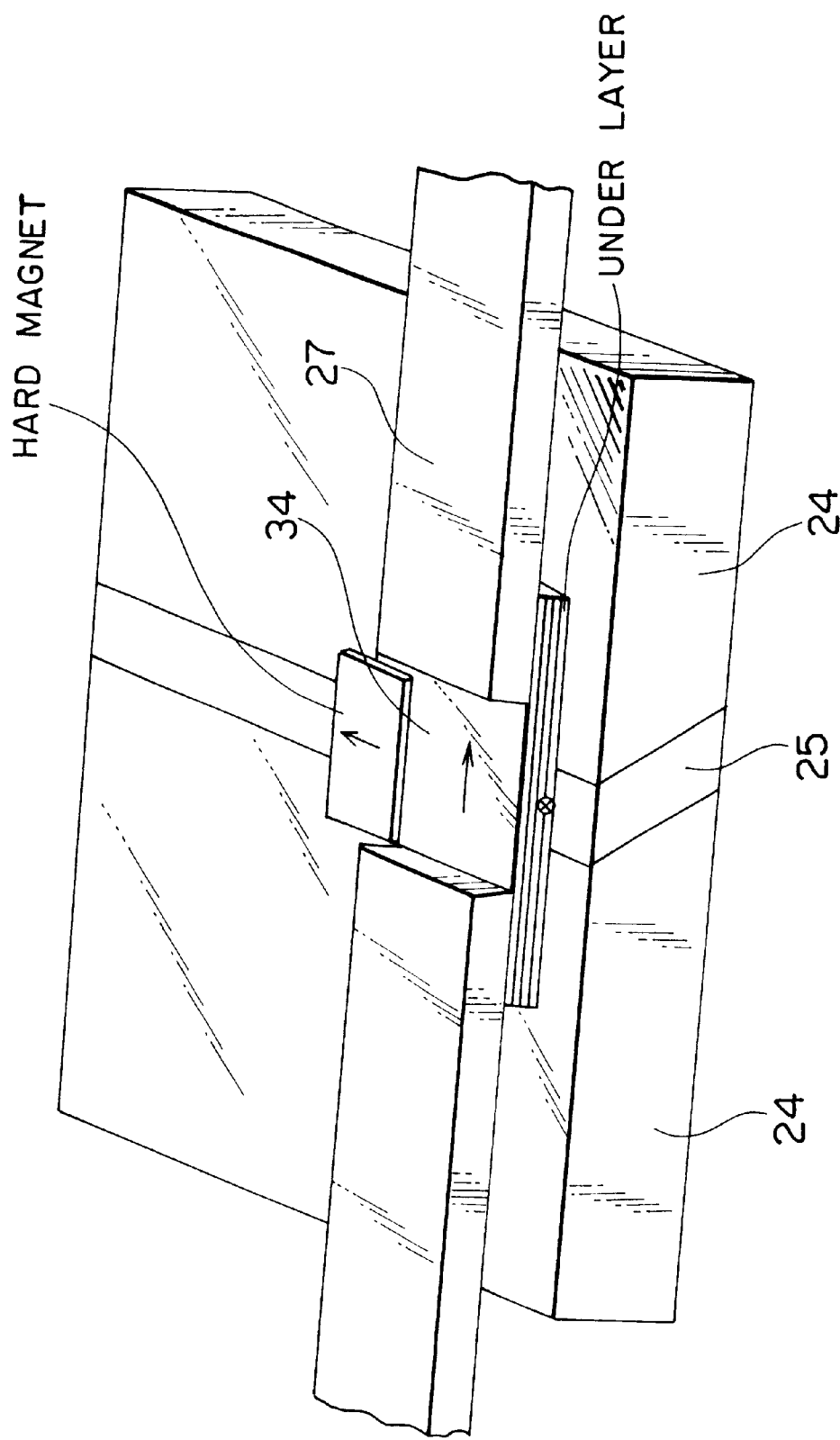
FIG. 12 is a perspective view showing a modification example of the magneto-resistance effective head.

On the other hand, by using a spin valve element, it is possible to set a magnetic moment of a free layer, which responds to a magnetic field, parallel to y-axis in FIG. 11. In FIG. 11 magnetic moment of pinned layer is set parallel to x-axis. In this configuration, magnetic flux is almost perpendicular to the magnetic moment of the free layer, therefore linearity of the output is almost conserved. Furthermore, inserting a soft magnetic layer with high resistivity exchange-coupled to the free layer under the spin valve element like in FIG. 12 can avoid magnetic saturation of the free layer when magnetic flux is excessively high at the overlap region. This underlayer makes head design easier and make it possible to supply several types of heads for variety of HDD systems by just optimizing the underlayer thickness. This is a great advantage for production.

Figure 13:
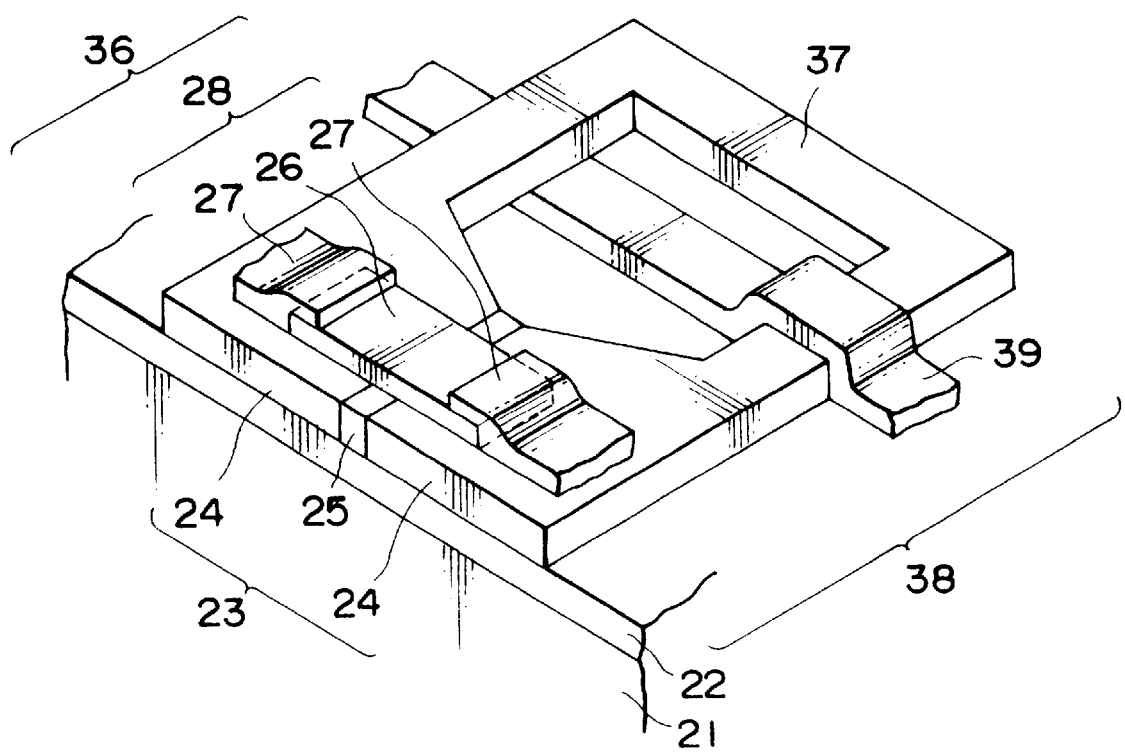
FIG. 13 is a perspective view showing an outlined construction of a magnetic recording/reproducing head according to an embodiment of the present invention.

Next, with reference to FIG. 13, a magnetic recording/reproducing head according to an embodiment of the present invention will be described.

The magnetic recording/reproducing head has a reproducing head that has the same construction as the yoke type MR head 36 shown in FIG. 1. For simplicity, in FIG. 13, the similar portions to those in FIG. 1 are denoted by the similar reference numerals and their description will be omitted. On the other hand, a recording head of the magnetic recording/reproducing head is constructed of an induction type magnetic head 38 that shares the magnetic substances 24 of the magnetic yoke 23 of the yoke type MR head 36 as a part of a magnetic core 37 and the magnetic gap 25. A recording coil 39 is disposed at the magnetic core 37.

In the above-described magnetic recording/reproducing head, since the track width and the gap length of the recording operation are the same as those of the reproducing operation, the alignment error between the recording operation and the reproducing operation becomes zero. Thus, the production cost can be reduced. If the recording head is spaced apart from the reproducing head, a disk loading is performed. In this case, a track error between the recording and reproducing operations takes place at an inner peripheral position of the disk. In addition, an azimuth loss takes place. However, according to the magnetic recording/reproducing head of the present invention, such problems can be solved. Thus, in a high density recording system with a high linear recording density, excellent recording and reproducing characteristics can be accomplished.

In the above-descried magnetic recording/reproducing head, when a current is supplied to a recording coil 39 in the reproducing operation, a bias magnetic field can be applied to the yoke type MR head 36. Thus, by applying the bias magnetic field to the yoke type MR head 36, the reproducing characteristics can be improved without need to use an extra bias magnetic field applying means.

As described above, according to the magneto-resistance effect head of the present invention, the fluctuation of the reproduced output can be suppressed. In addition, a good reproduced output can be obtained. Thus, in for example a low floating head, high reliability and highly reproduced output can be obtained. Moreover, since the fluctuation of the reproduced output and the production cost are reduced, the head can be quantitatively produced. Furthermore, according to the magnetic recording/ reproducing head of the present invention, since the alignment error between the recording and reproducing operations can be reduced to zero, excellent recording/reproducing characteristics can be obtained at a low cost.

Figure 14:
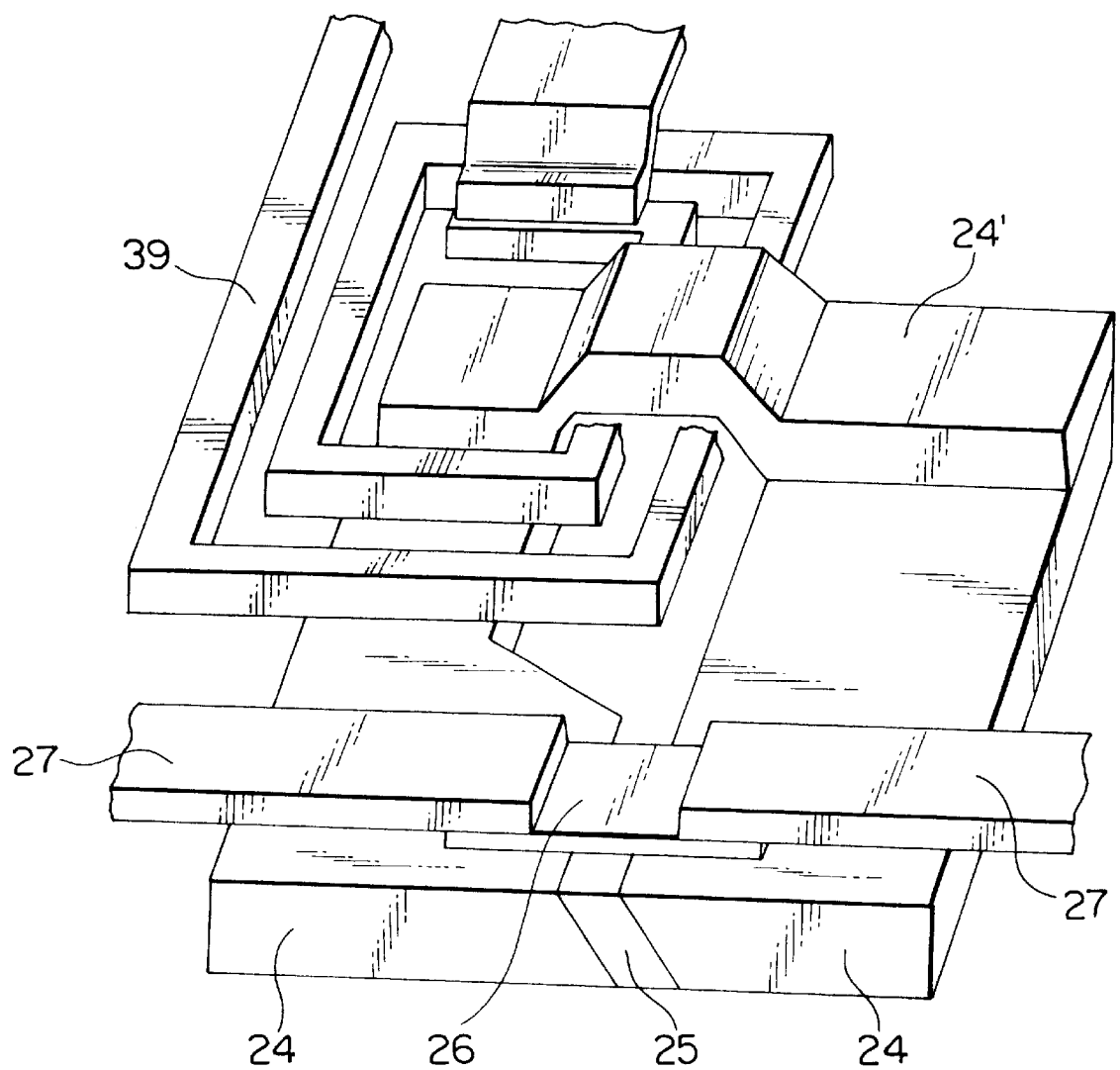
FIG. 14 is a perspective view showing a modification example of the outlined construction of the magnetic recording/reproducing head.
Figure 15:
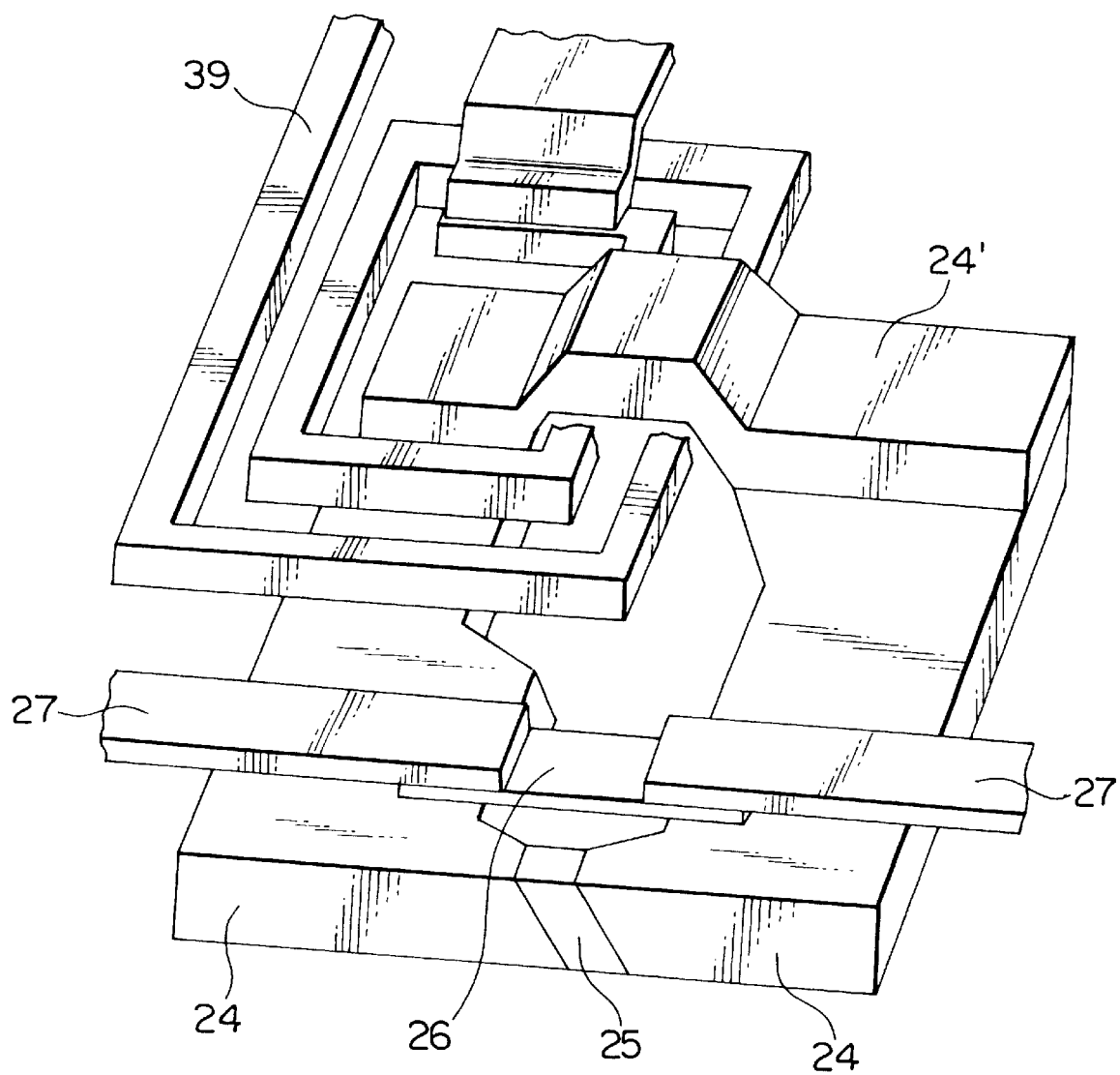
FIG. 15 is a perspective view showing a modification example of the outlined construction of the magnetic recording/reproducing head.
Figure 16:
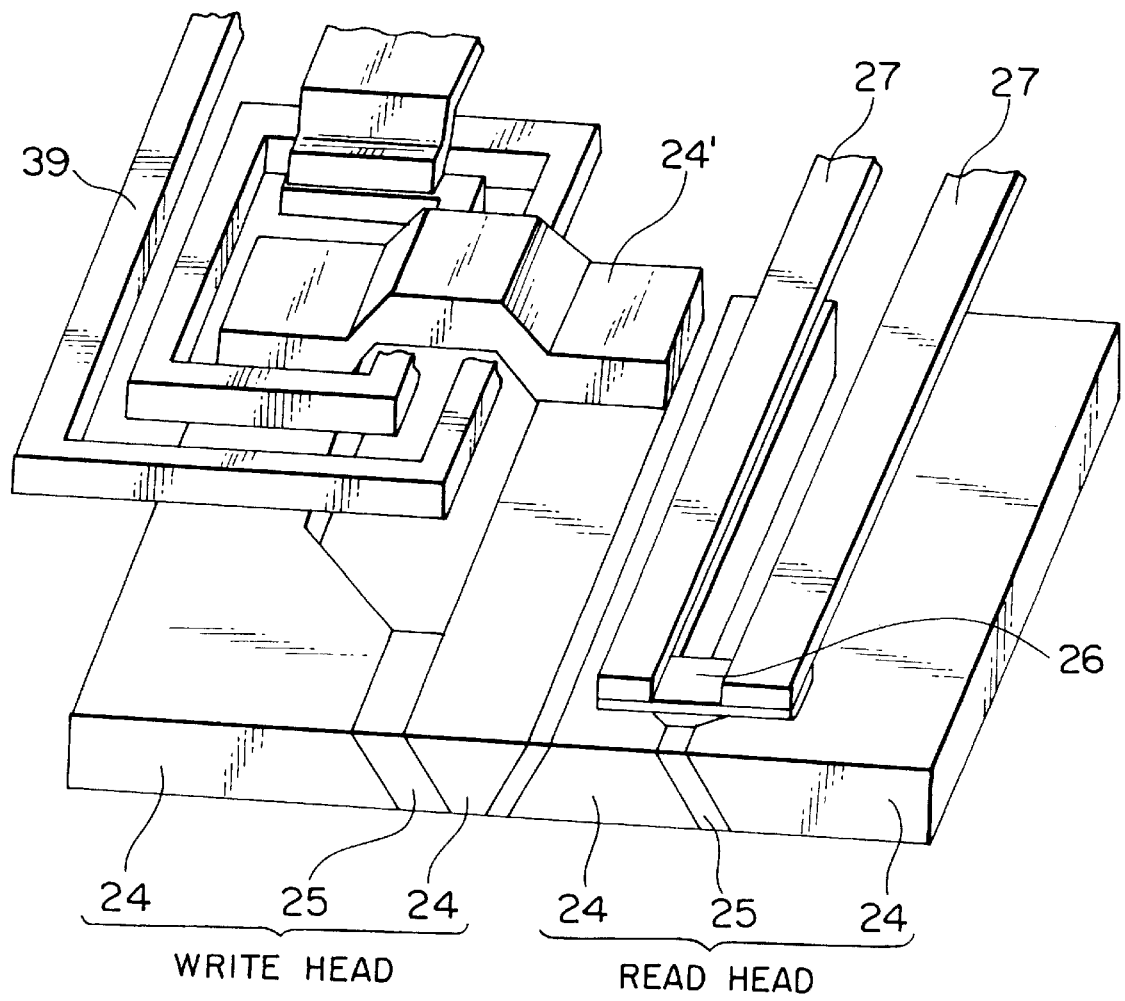
FIG. 16 is a perspective view showing a modification example of the outlined construction of the magnetic recording/reproducing head.
Figure 17:
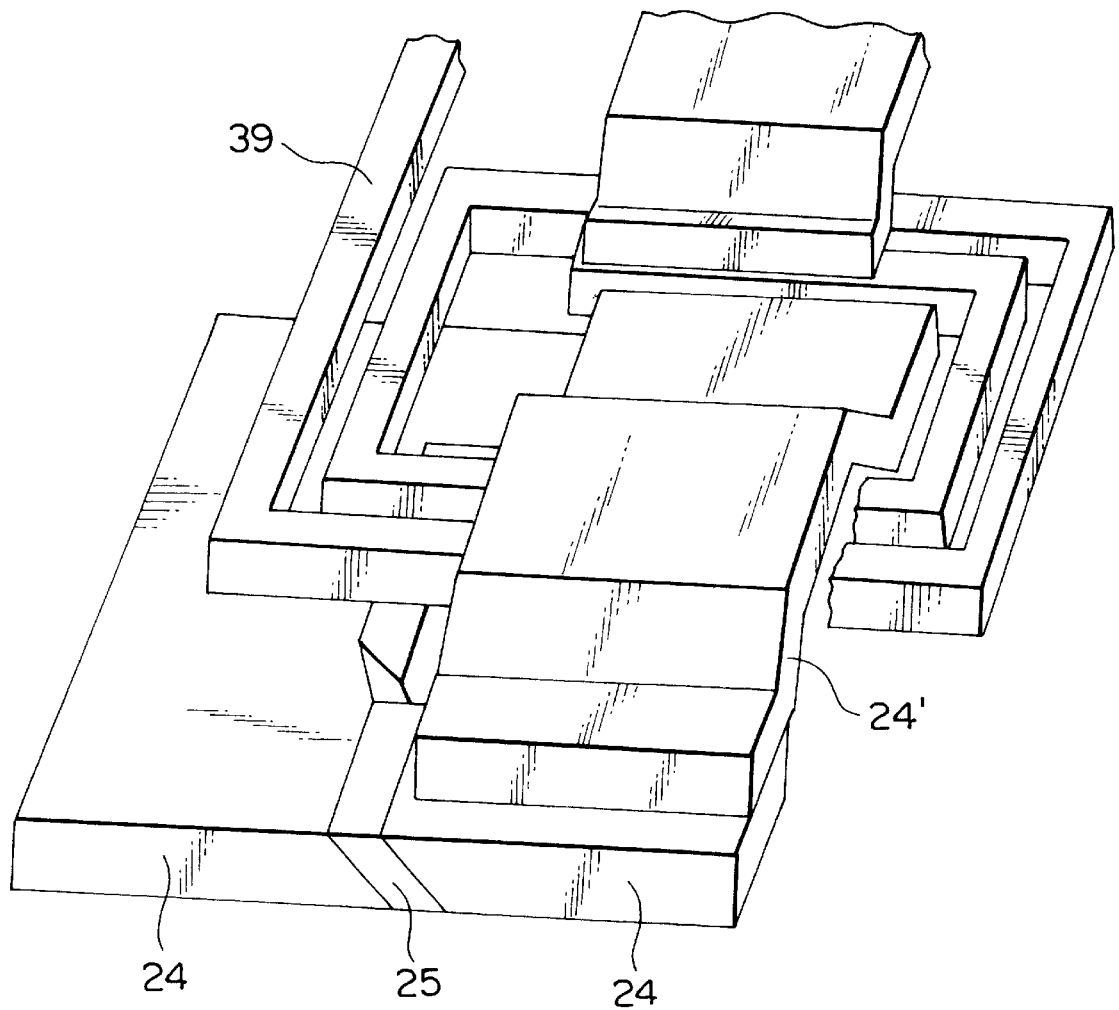
FIG. 17 is a perspective view showing a modification example of the outlined construction of the magnetic recording head according to the present invention.
Figure 18:
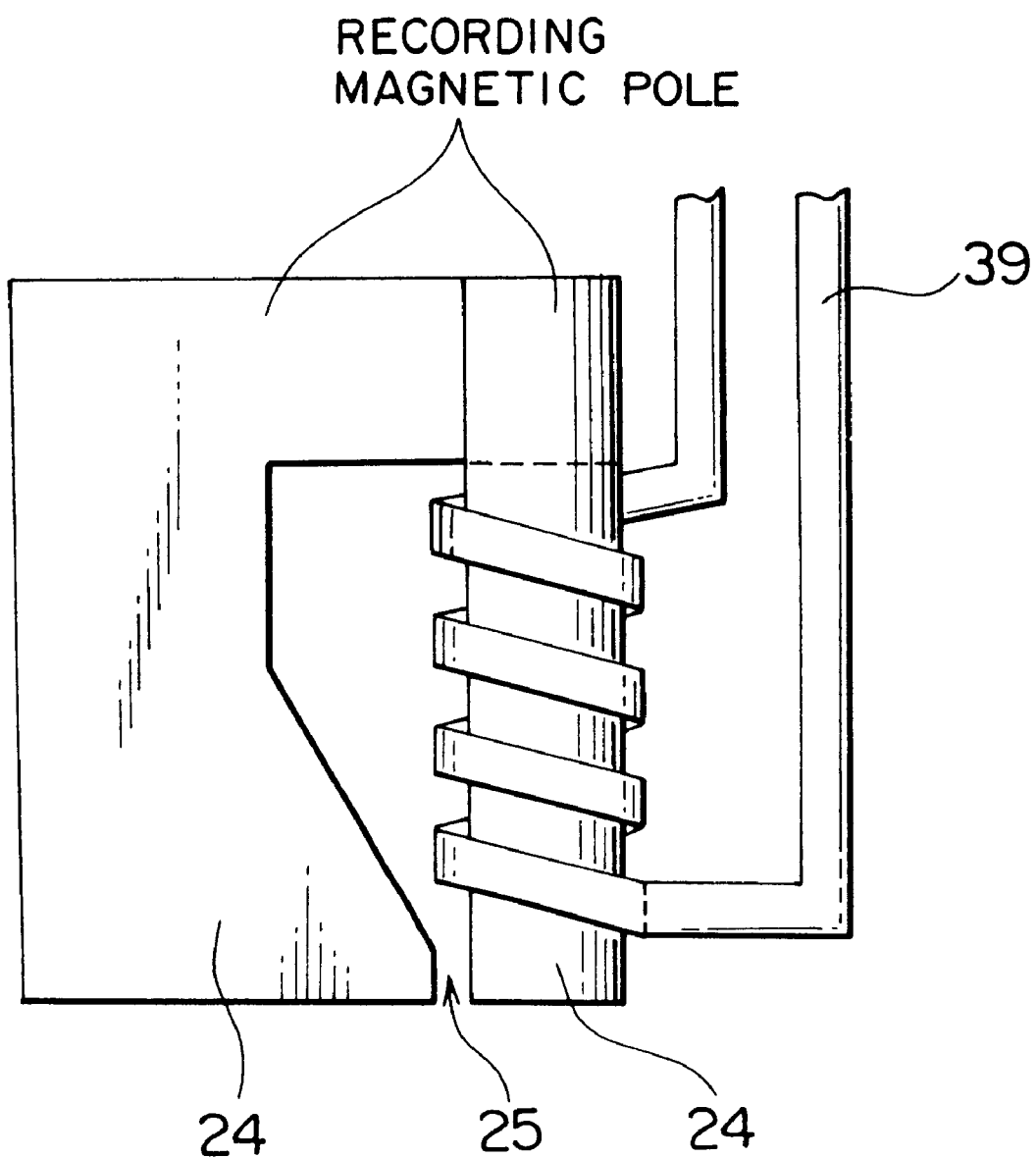
FIG. 18 is a perspective view showing a modification example of the outlined construction of the magnetic recording head according to the present invention.
Figure 19:
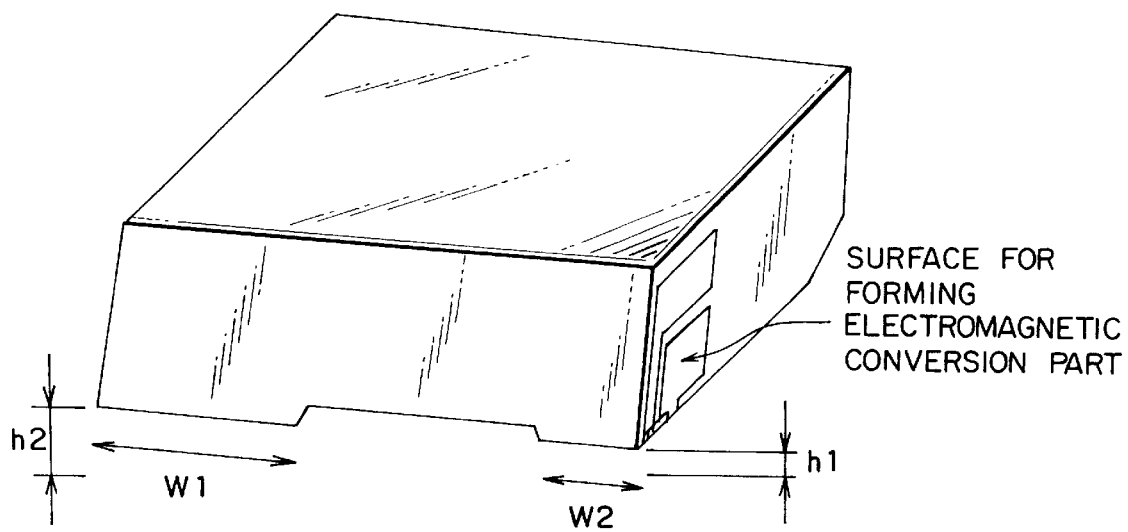
FIG. 19 is a perspective view showing an example of a slider having the magnetic head of the present invention.
Figure 20:
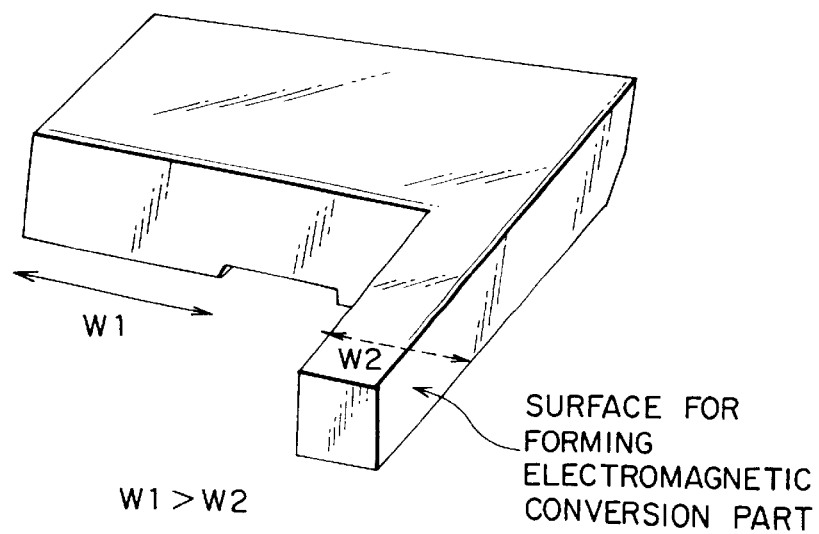
FIG. 20 is a perspective view showing an example of a slider having the magnetic head of the present invention.

FIG. 14 to FIG. 18 show other examples of the invention. FIG. 14 is a read-write head which has a magnetic gap in common for reading and writing. FIG. 15 is a read-write head which has a magnetic gap in common for reading and writing and a spin valve element placed over the yoke region where the distance between the yokes is larger than a magnetic gap length, which make the length of the spin valve element long enough to have the resistance larger than 1 to get higher output. FIG. 16 is a read-write head in which a read head is placed next to the write head and isolated from the write head to get the less magnetic interaction between the write head and the read head to minimize the write-after-noise. FIG. 17 and FIG. 18 are write heads having higher efficiency of writing by making the yoke region, where yokes overpass coils, close to magnetic gaps. FIG. 19 shows an example of the slider having the magnetic head of the invention on the right side of the slider with two air bearing surface. The width of the left air bearing surface is larger than that of the right air bearing surface to make the gap region of the head contact to a media. In FIG. 20, a right part of the slider, which have the magnetic head of the invention on the right side, is projected to ensure the head-to-media contact.

Since the magneto-resistance effect head according to the present invention has the above-described construction, it can be used as the following multi-head.

Figure 21:
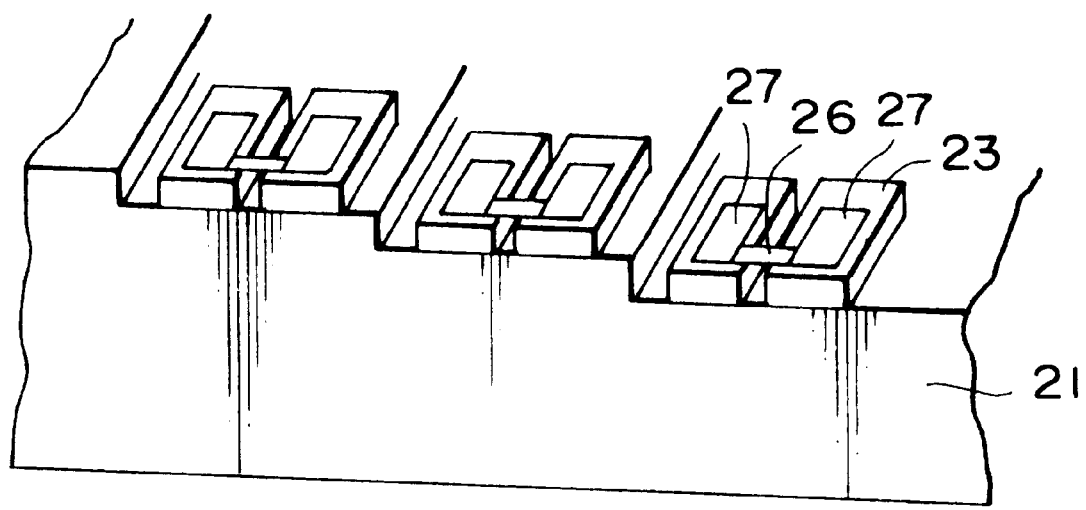
FIG. 21 is a perspective view showing an example of a construction of which a plurality of magneto-resistance effect heads according to the present invention are used for a multihead.

When a transmission rate of a HDD or the like is as large as several hundred mega bytes per sec, several heads are required. In this case, as shown in FIG. 21, a plurality of the MR magnetic heads of the present invention are disposed in a stair shape. Thus, reproduction tracks can be formed at very small pitches s. Consequently, this effect is very significant in comparison with the conventional magnetic head.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A magneto-resistance effect head comprising:

a magnetic yoke having a major surface substantially forming a single plane and including a first magnetic yoke member, a second magnetic yoke member, and a magnetic gap, the gap being located between said first and second magnetic yoke members, and a medium facing surface substantially perpendicular to and adjacent to said major surface and including said first magnetic yoke member, said second magnetic yoke member, and said magnetic gap;

a magneto-resistance effect film disposed on said major surface of said magnetic yoke, the magneto-resistance effect film being recessed a predetermined distance from said medium facing surface, and said major surface being substantially in parallel with a magnetic flow from said medium to, in order, said first magnetic yoke member, said magneto-resistance effect film, and said second magnetic yoke member; and a pair of leads giving a sense current to said magneto-resistance effect film, said magneto-resistance effect film overlapping said first and second yoke members with an overlap length large enough to permit most of a magnetic flux flowing in the head to be directed to the magneto-resistance effect film; and wherein the magnetic gap extends from the medium facing surface to the magneto-resistance effect film, and a width of the magnetic gap at the medium facing surface is substantially the same as a width of the magnetic gap at which the magneto-resistance effect film is disposed.

2. The magneto-resistance effect head as claimed in claim 1, wherein the magneto-resistance effect film is a spin-valve film.

3. The magneto-resistance effect head as claimed in claim 2, wherein the spin-valve film includes a magnetically free layer having a magnetic moment which responds to a magnetic field and a magnetically pinned layer having a magnetic moment substantially parallel to said medium facing surface.

4. The magneto-resistance effect head as claimed in claim 1, wherein the first and second magnetic members and said magneto-resistance effect film are disposed on a substrate.

5. The magneto-resistance effect head as claimed in claim 1, wherein the sum of the distance of said magneto-resistance effect film to the medium facing surface and the width of said magneto-resistance effect film is smaller than a characteristic length $\lambda$, and wherein the characteristic length $\lambda$ is the distance of which a magnetic flux density that passes through the first and second magnetic yoke members attenuates to 1/e of that at the magnetic gap.

6. The magneto-resistance effect head as claimed in claim 1, wherein said magneto-resistance effect film is a laminate film composed of a non-magnetic film interposed between a pair of magnetic films.

7. The magneto-resistance effect head as claimed in claim 6, wherein a magnetization fixing film is in contact with one of the magnetic films of the laminate film.

8. A magneto-resistance effect head comprising:

a magnetic yoke having a major surface substantially forming a single plane and including a first magnetic yoke member, a second magnetic yoke member, and a magnetic gap, the gap being located between said first and second magnetic yoke members, and a medium facing surface substantially perpendicular to and adjacent to said major surface and including said first magnetic yoke member, said second magnetic yoke member, and said magnetic gap;

a magneto-resistance effect film disposed on said major surface of said magnetic yoke, the magneto-resistance effect film being recessed a predetermined distance from said medium facing surface, and said major surface being substantially in parallel with a magnetic flow from said medium to, in order, said first magnetic yoke member, said magneto-resistance effect film, and said second magnetic yoke member; and a pair of leads giving a sense current to said magneto-resistance effect film, said magneto-resistance effect film overlapping said first and second yoke members with an overlap length large enough to permit most of a magnetic flux flowing in the head to be directed to the magneto-resistance effect film; and wherein the sum of the distance of said magneto-resistance effect film to the medium facing surface and the width of said magneto-resistance effect film is smaller than a characteristic length, $\lambda$, and wherein the characteristic length $\lambda$ is the distance at which a magnetic flux density that passes through the first and second magnetic yoke members attenuates to 1/e of that at the magnetic gap; and wherein the distance of the magneto-resistance effect film to the medium facing surface is smaller than the width of the magneto-resistance effect film.

* * * * *